United States Patent [19]

Whikehart

[11] Patent Number: 5,222,144
[45] Date of Patent: Jun. 22, 1993

[54] DIGITAL QUADRATURE RADIO RECEIVER WITH TWO-STEP PROCESSING

[75] Inventor: J. William Whikehart, Novi, Mich.

[73] Assignee: Ford Motor Company, Dearborn, Mich.

[21] Appl. No.: 783,470

[22] Filed: Oct. 28, 1991

[51] Int. Cl.$^5$ .............................................. H04H 5/00
[52] U.S. Cl. ...................................... 381/15; 375/39; 375/94
[58] Field of Search ...................... 381/15, 16; 375/39, 375/94

[56] References Cited

U.S. PATENT DOCUMENTS

| | | | |
|---|---|---|---|
| 4,159,396 | 6/1979 | Hilbert et al. | 179/1 GS |
| 4,164,623 | 8/1979 | Hilbert et al. | 179/1 GS |
| 4,170,716 | 10/1979 | Hilbert et al. | 179/1 GS |
| 4,192,968 | 3/1980 | Hilbert et al. | 179/1 GS |
| 4,218,586 | 8/1980 | Parker et al. | 179/1 GS |
| 4,232,189 | 11/1980 | Leitch | 179/1 G |
| 4,324,952 | 4/1982 | Smiley | 179/1 GS |
| 4,371,747 | 2/1983 | Hilbert | 179/1 GS |
| 4,377,728 | 3/1983 | Hilbert | 179/1 GS |
| 4,464,770 | 8/1984 | Maurer et al. | 375/119 |
| 4,580,284 | 4/1986 | Ecklund et al. | 381/15 |
| 4,592,074 | 5/1986 | Whikehart | 375/75 |
| 4,617,537 | 10/1986 | Nossek | 375/39 |
| 4,653,095 | 3/1987 | Kahn | 381/15 |
| 4,653,117 | 3/1987 | Heck | 455/209 |
| 4,680,795 | 7/1987 | Ecklund | 381/15 |
| 4,733,403 | 3/1988 | Simone | 375/103 |
| 4,736,390 | 4/1988 | Ward et al. | 375/75 |
| 4,737,728 | 4/1988 | Nakamura et al. | 375/39 |
| 4,747,141 | 5/1988 | Kahn | 381/15 |
| 4,779,054 | 10/1988 | Monteleone et al. | 375/94 |
| 4,782,532 | 11/1988 | Ecklund | 381/15 |
| 4,794,623 | 12/1988 | Levesque et al. | 375/39 |
| 4,837,853 | 6/1989 | Heck | 455/208 |
| 4,887,050 | 12/1989 | Borth et al. | 331/34 |
| 4,893,316 | 1/1990 | Janc et al. | 375/44 |
| 5,003,621 | 3/1991 | Gailus | 455/209 |

OTHER PUBLICATIONS

Specification sheet for Motorola MC13020P AM Stereo Decoder.
Motorola Application Note, Apr 1/D, "Digital Sine-Wave Synthesis Using the DSP56001".
Anderson et al., "Digital Signal Processing Techniques for HF Receiver Design", *Defense Science & Electronics*, Jan. 1985, pp. 36–40.
Takahashi et al., "Direct AM Stereo Detection by a PLL Synthesized Synchronous Carrier Generator", J. Audio Eng. Soc., Fol. 31, No. 5, May 1983 pp. 326–331.
Lugowski, "AM Stereo and FM Stereo Detection: An Implicit Approach", *Electronics Letters*, vol. 22, No. 19, Sep. 1986, pp. 973–974.
Tanaka et al., "Single Chip Multisystem AM Stereo Decoder IC", IEEE Trans. Cons. Elect., vol. CE-32, No. 3, Aug. 1986, pp. 482–496.
Temerinac et al., "MF-AM Stereo Broadcasting: The Choice of Modulation", IEEE Trans. Broadcasting, vol. 35, No. 1, Mar. 1989, pp. 79–87.

*Primary Examiner*—Forester W. Isen
*Attorney, Agent, or Firm*—Mark Mollon; Roger L. May

[57] ABSTRACT

A digital signal processing (DSP) radio receiver employs a conventional analog RF tuner to produce an analog intermediate frequency. The receiver performs DSP functions of digitally sampling the analog intermediate frequency at a sampling rate $f_s$, concurrently mixing, filtering, and sample-rate reducing the sampled intermediate frequency using a digital filter for inherently generating a near-zero complex intermediate frequency signal, and synchronously detecting the complex IF signal. In a preferred embodiment, the invention is employed to reproduce AM stereo signals.

15 Claims, 7 Drawing Sheets

(PRIOR ART)

FIG. 1

(PRIOR ART)

FIG. 2

(PRIOR ART)

FIG. 3

(PRIOR ART)

COS = 1, 0, -1, 0, ...
SIN = 0, 1, 0, -1, ...

DIGITAL QUADRATURE RADIO RECEIVER WITH TWO-STEP PROCESSING

BACKGROUND OF THE INVENTION

The present invention relates in general to a digital radio receiver employing quadrature signal processing and more specifically to a digital radio receiver for reproducing AM stereo radio signals.

Commercial radio services, such as AM and FM, are broadcast as a modulated analog signal. Certain radio receivers have been employed which convert the received analog signal into a digital signal for performing digital signal processing (DSP) to thereby realize various advantages, such as circuit integration, reduced size, exact operation, minimal adjustments, and the ability to combine signal processing with other audio functions (e.g., tone control, concert hall emulation, and equalization) also performed in DSP.

The cost of implementing a particular receiver using DSP components increases with the amount of processing required to perform the desired functions. The processing load of a particular DSP system depends on the functions implemented and on the number of samples in the digital signal which must be processed in a given amount of time, i.e., the sampling rate $f_s$ in samples per second. The sampling rate $f_s$ must be at least two times the frequency bandwidth of the sampled signal to avoid distortion. In a radio receiver, the sampled signal is typically an intermediate frequency (IF) signal from an analog tuner stage. The analog IF is centered at a non-zero frequency and is typically 455 kHz in an AM receiver and 10.7 MHz in an FM receiver.

In order to initiate digital signal processing, the IF signal is converted to a digital IF signal using an analog-to-digital (A/D) converter.

It is known to reduce digital processing load by representing the digital IF signal as a quadrature signal with an in-phase (I) component and a quadrature-phase (Q) component. It is preferable to form the I and Q signals after conversion to digital signals due to the difficulties encountered in matching the I and Q signal path characteristics in analog circuitry.

U.S. Pat. No. 4,893,316 to Janc et al discloses a digital signal processing receiver employing quadrature signals. Janc et al employs two injection (i.e., mixing) signals from a digital quadrature local oscillator for mixing with the digital signal to produce the I and Q signal components comprising a nominal zero-Hertz intermediate frequency.

U.S. Pat. No. 4,592,074 to Whikehart teaches a technique for forming I and Q components simultaneously with a reduction in sampling rate in a digital filter without the need for actual injection signals. By selecting the input IF frequency and the injection frequency to both be at one-quarter of the sampling rate $f_s$, the values for the injection signal become repeating sine and cosine sequences of the values 1, 0, and −1, which can be directly implemented in the digital filter without an oscillator.

The technique taught in U.S. Pat. No. 4,592,074 requires that the injection frequency remain fixed at one-quarter of the sampling rate. However, depending on the particular radio signal to be received, it may be necessary or desirable to employ a signal detection scheme using a variable injection frequency. One such particular type of radio signal is an AM stereo signal which includes phase-encoded information that must be demodulated using synchronous detection. Synchronous detection requires a changing injection frequency locked to the frequency of the IF signal in order to recover the original audio signals without distortion.

SUMMARY OF THE INVENTION

It is a principal object of the present invention to provide method and apparatus for digital signal processing of radio signals at a reduced DSP processing load.

It is a further object of the invention to simultaneously obtain the advantages of synchronous detection and low sampling rate in a digital radio receiver.

These and other objects are achieved in a receiver for performing a two-step digital processing of radio signals. An analog-to-digital converter operates at a sampling rate $f_s$ to convert an analog IF signal to a first digital IF signal comprised of a plurality of samples. The first digital IF signal has a center frequency about equal to $f_s/4$. A concurrent complex-mixing, filtering, and sample-rate reducing means generates a complex IF signal having a near-zero center frequency within a frequency range from $-f_s/8$ to $+f_s/8$. The complex IF signal has an in-phase component (I) and a quadrature-phase (Q), each being formed from weighted alternate samples of the first digital IF signal according to a set of predetermined filter-tap weights. The predetermined weights correspond to a complex mixing signal having a frequency equal to $f_s/4$ and corresponding to a reduction in sampling rate by a whole multiple of 4. For the second processing step, a complex mixing means is coupled to the concurrent means for synchronously detecting the complex IF signal. The complex mixing means includes a variable oscillator producing sine and cosine signals locked to the frequency and phase of the complex IF signal.

In a preferred embodiment of the invention, the received radio signals are AM stereo signals broadcast in the C-QUAM format.

BRIEF DESCRIPTION OF THE DRAWINGS

The novel features of the invention are set forth with particularity in the appended claims. The invention itself, however, both as to its organization and method of operation together with further objects and advantages thereof, may best be understood by reference to the following description taken in conjunction with the accompanying drawings in which:

DETAILED DESCRIPTION OF PREFERRED EMBODIMENTS

Figure 1:
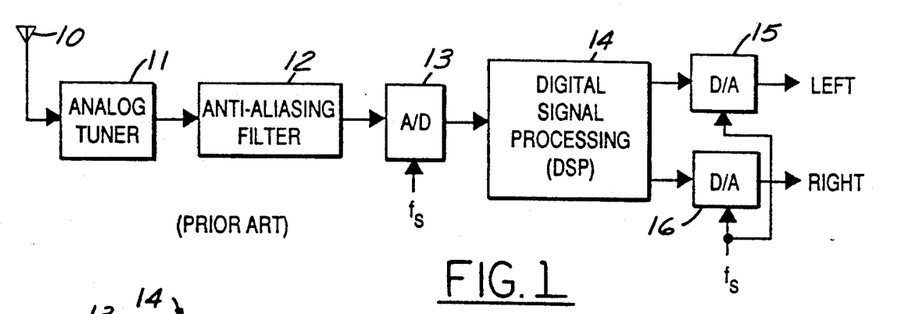
FIG. 1 is a block diagram showing a conventional architecture for a digital signal processing receiver.

Referring to FIG. 1, an antenna 10 receives a radio broadcast wave and a resulting analog antenna signal is provided to an analog tuner 11. The output from analog tuner 11 is coupled to an anti-aliasing filter 12 and to an A/D converter 13. If the output of analog tuner 11 is sufficiently band limited, then anti-aliasing filter 12 is not required prior to digital conversion by A/D converter 13. A/D converter 13 is clocked at a sampling rate $f_s$ to provide digital samples at the sampling rate to a digital signal processing (DSP) block 14. The radio signal represented by the digital samples is demodulated using DSP techniques. Other processing, including stereo decoding, is also performed in DSP block 14 to produce left and right stereo signals. D/A converters 15 and 16 convert the stereo signals to analog form. D/A converters 15 and 16 receive a clocking signal at sampling rate $f_s$.

Figure 2:
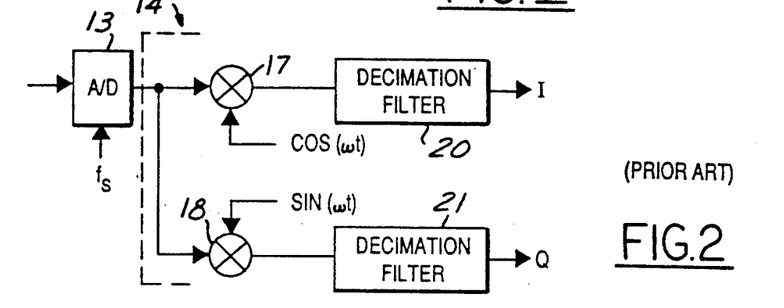
FIG. 2 is a block diagram showing a prior art technique for obtaining digital I and Q signals employing an oscillator.

FIG. 2 demonstrates a prior art technique for reducing the processing rate required for DSP block 14. Digital samples from A/D converter 13 are provided to digital mixers 17 and 18. A digital quadrature oscillator (not shown) provides quadrature mixing signals $COS(\omega t)$ and $SIN(\omega t)$ to digital mixers 17 and 18, respectively. The resulting mixer outputs are provided to respective decimation filters 20 and 21 having respective I and Q outputs comprising digital samples at a lower sampling rate $f_s'$.

Figure 3:
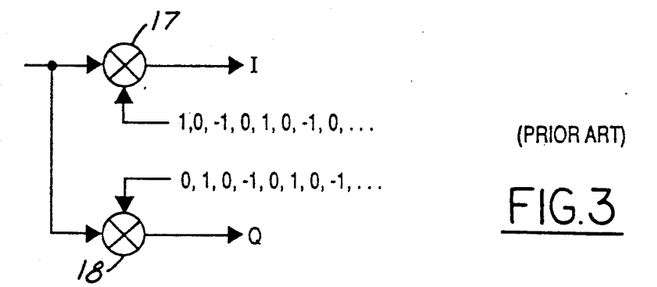
FIG. 3 shows a digital injection signal for forming I and Q signals wherein the injection frequency corresponds to one-quarter of the sampling rate.
Figure 4:
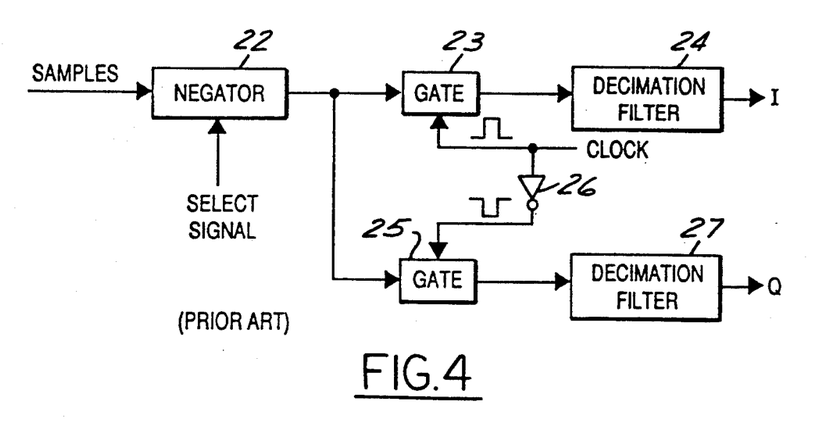
FIG. 4 is a block diagram showing a prior art digital filter for generating digital I and Q signals without an oscillator.

The digital injections (i.e, mixing) signals from the digital quadrature oscillator are provided at sampling rate $f_s$ (i.e., the same sampling rate as the IF signal). As shown in FIG. 3, when the frequency of the injection signal $\omega$ corresponds to one-quarter of the sampling rate $f_s$, then the injection signals can be characterized by repeating sine and cosine sequences of the values 1, 0, and −1. This relationship is utilized in previously mentioned U.S. Pat. No. 4,592,074 wherein the sine and cosine sequences are implemented as part of a digital filter so that the digital mixers 17 and 18 are not required. As shown in FIG. 4, samples are provided to a negator 22 for selectively negating the samples in response to a select signal corresponding to the appropriate sign of the sine and cosine injections. The selectively negated samples are provided to a gate 23 and a gate 25. A clock signal is provided to a control input of gate 23 for transmitting alternate samples from negator 22 to a decimation filter 24 which reduces the sampling rate and provides an in-phase I digital output signal. The clock signal is inverted by an inverter 26 for controlling gate 25 to transmit the other alternate samples to a decimation filter 27 for producing a quadrature-phase Q digital output signal at a reduced sampling rate $f_s'$.

As described in the '074 patent, if the intermediate frequency and the injection frequency are both one-quarter of the sampling rate, then the I and Q components are translated to a nominal zero Hertz (i.e., baseband) intermediate frequency signal. However, since the injection frequency is at a fixed frequency, the mixing operation cannot be phased locked to the incoming IF signal (i.e., synchronous detection is not obtainable).

Figure 5:
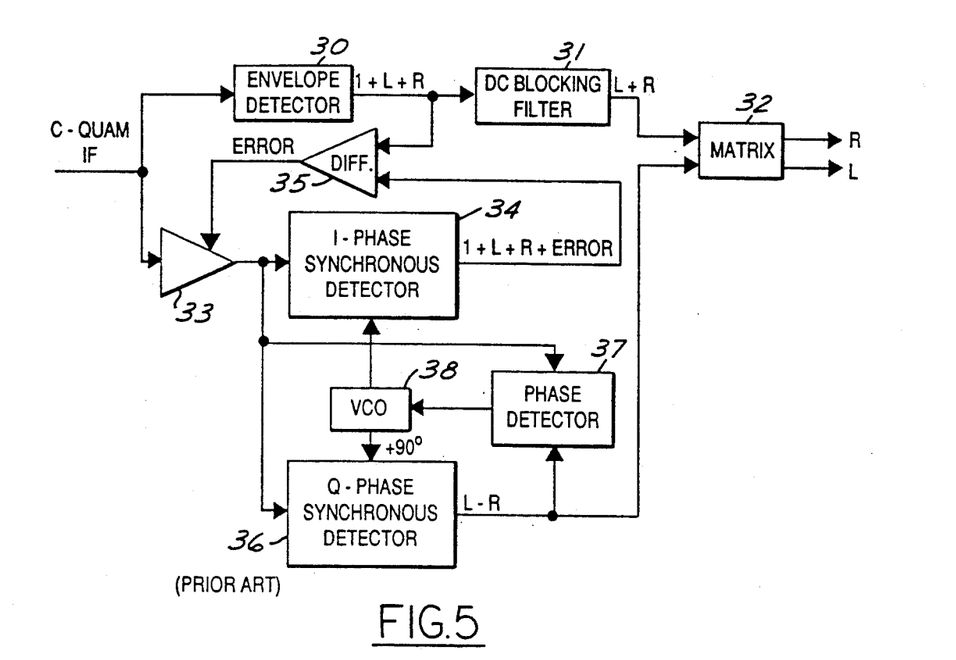
FIG. 5 is a block diagram showing an analog receiver for receiving AM stereo signals in the C-QUAM format.

Certain types of intermediate frequency signals may preferably be demodulated using synchronous detection. For example, FIG. 5 shows a conventional analog receiver for processing AM stereo signals received in the compatible quadrature amplitude modulation (C-QUAM) format. The MC13020P AM stereo decoder integrated circuit available from Motorola Semiconductor Products, Inc. of Phoenix, Ariz., implements the C-QUAM function of FIG. 5.

A C-QUAM IF signal is provided to an envelope detector 30 which provides an envelope signal equal to 1+L+R to a DC blocking filter 31. After the DC offset is removed in DC blocking filter 31, an L+R signal is provided to a stereo decoder matrix 32 for producing right and left channel audio outputs.

The remainder of FIG. 5 converts the C-QUAM IF signal to a QUAM IF signal in order to generate the difference signal L−R for input to matrix 32. The C-QUAM IF signal is provided to a variable gain amplifier 33. The output of amplifier 33 is coupled to an in-phase synchronous detector 34 and a quadrature-phase synchronous detector 36. The output of detector 34 provides an output signal corresponding to 1+L+R+ERROR to one input of a difference amplifier 35. The other input of difference amplifier 35 receives the 1+L+R signal from envelope detector 30. Difference amplifier 35 is a high gain amplifier and provides an ERROR signal to the gain control input of variable gain amplifier 33. Since difference amplifier 35 is a high gain amplifier, the output of amplifier 33 corresponds to a QUAM signal.

The output of Q-phase synchronous detector 36 is connected to matrix 32 and to a phase detector 37. The QUAM signal from amplifier 33 is connected to another input of phase detector 37. The output of phase detector 37 is connected to a voltage-controlled oscillator (VCO) 38 which provides a cosine signal to in-phase synchronous detector 34 and a sine signal (phase shifted by 90° with respect to the cosine signal) to quadrature-phase synchronous detector 36. Thus, phase detector 37 and VCO 38 form a phase-locked loop.

Figure 6:
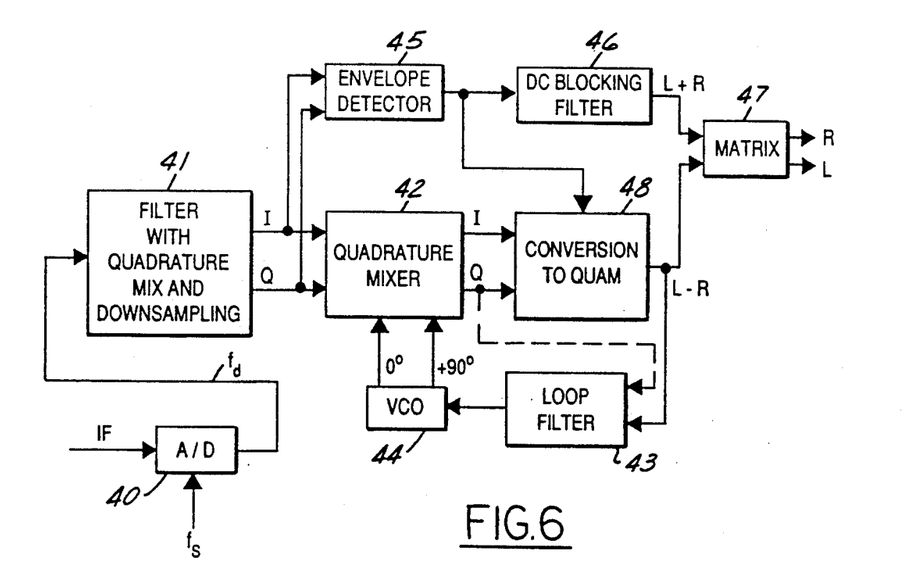
FIG. 6 is a block diagram showing a preferred embodiment of the present invention wherein digital signal processing is employed to receive an AM stereo signal in the C-QUAM format.

FIG. 6 shows a preferred embodiment of the present invention for implementing a synchronous detector using digital signal processing at a reduced processing load. Analog IF signals are provided to an A/D converter 40 and converted to a digital IF signal with a center frequency $f_d$. The digital samples at a sampling rate $f_s$ are input to a concurrent filter 41. Filter 41 provides, quadrature mixing and downsampling functions. The quadrature mixing function preferably results in a shifted IF center frequency near zero, but not necessarily exactly equal to zero. The sample-rate reduced, near-zero Hertz I and Q signals from filter 41 are provided to a quadrature mixer 42 which is phase locked to provide synchronous detection by means of a loop filter 43 and a digital VCO 44. Thus, concurrent filter 41 reduces the processing load by performing a quadrature mixing operation to create a complex IF signal having an in-phase component I and a quadrature-phase component Q. The complex IF signal, now at a reduced sampling rate, undergoes a second complex mixing operation in quadrature mixer 42. During demodulation of a C-QUAM signal, quadrature mixer 42 becomes locked to the near-zero-Hertz complex IF signal and produces at its outputs a synchronous-detector I signal and a synchronous-detector Q signal which together form a zero Hertz IF signal.

VCO 44 is implemented using known DSP techniques (see, e.g., Motorola Application Note, "Digital Sine-Wave Synthesis Using the DSP56001").

FIG. 6 shows the two-step processing of the invention in the context of an AM stereo receiver for signals broadcast in the C-QUAM format. An envelope detector 45 receives the near-zero-Hertz complex IF signal and determines the envelope by calculating the square root of the sum of the squares of the in-phase and quadrature-phase components. The detected envelope is provided to a DC blocking filter 46 which may be comprised of a lowpass filter for isolating the DC component and a summer for subtracting out the DC component from the envelope signal. An L+R audio signal is provided from DC blocking filter 46 to a stereo decoder matrix 47 which generates left and right stereo signals. The detected envelope from envelope detector 45 is also provided to a conversion block 48 which further receives from mixer 42 the synchronous-detector I signal and the synchronous-detector Q signal from quadrature mixer 42. An L−R audio signal is obtained from the synchronous-detector Q signal by converting it to a QUAM signal. The L−R signal is provided to matrix 47 for stereo decoding and to loop filter 43 for implementing a phase-locked loop in conjunction with VCO 44. Alternatively, loop filter 43 may directly employ the synchronous-detector Q signal as its sole input signal for closing the phase-locked loop.

The conversion to QUAM performed by conversion block 48 can be implemented according to various methods, e.g., the implicit method, the inverse function method, and the divider method, which will be described later with reference to FIGS. 22–24.

Figure 7:
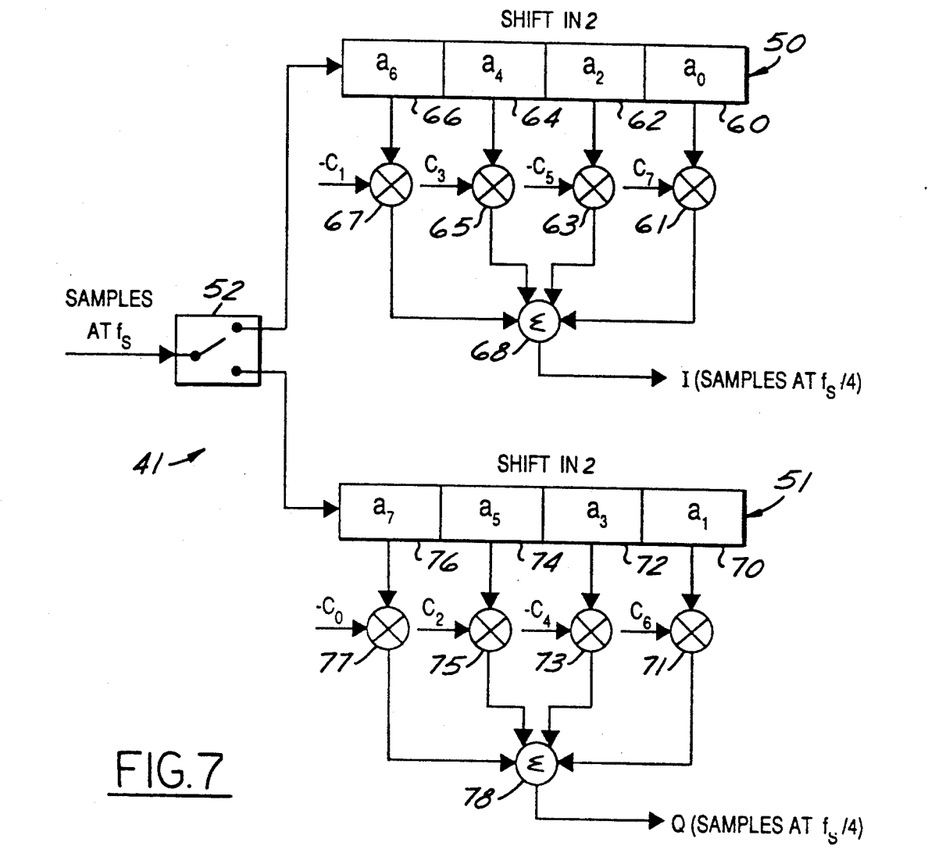
FIG. 7 is a block diagram showing a preferred embodiment of a concurrent filter for generating digital I and Q signals as shown in FIG. 6.

Concurrent filter 41 for providing quadrature mixing and downsampling functions is shown in greater detail in FIG. 7. Concurrent filter 41 consists of separate I and Q parallel filters of the finite-impulse-response (FIR) type. An FIR filter uses a tapped delay line (i.e., shift register) to store past input samples which are multiplied by filter-tap weights and summed to form an output sample. In general, for decimation by 4 in an FIR filter, the filter must be x*4 taps in length, where x is an integer greater than zero. Thus, the smallest filter decimating by 4 would have 4 taps.

In FIG. 7, the separate I and Q portions of the filter each mathematically correspond to 8-tap filters, although each filter actually needs only 4 taps because of a hardware simplification resulting in the present invention from the fact that the other 4 taps are always multiplied by zero, as will be discussed later. Alternatively, a 4-tap filter decimating by 4 could be employed with only 2 taps being actually needed in the separate I and Q portions of the filter, resulting in the smallest possible filter. The size of filter employed depends on the specific filtering desired in a particular design.

In FIG. 7, digital samples are alternately provided to a pair of shift registers 50 and 51 using a demultiplexer 52, for example. Shift register 50 includes elements 60, 62, 64 and 66 for shifting in two samples for calculating every I output sample. Shift register 51 includes elements 70, 72, 74, and 76 for shifting in two samples for calculating every Q output sample. Thus, a sequence of eight digital samples designated $a_0, a_1, \ldots a_7$ (where $a_0$ precedes $a_1$, etc.), are passed through demultiplexer 52 into shift registers 50 and 51 in the 8-tap filters as shown.

A set of four input samples passed through demultiplexer 52 (two provided to the I portion of the filter and two provided to the Q portion of the filter) are thus digitally filtered to provide a single I-and-Q-pair output sample (i.e., a decimation by 4). In forming one output sample, a multiplier 61 receives digital sample $a_0$ for multiplication by a constant $c_7$. A multiplier 63 receives digital sample $a_2$ for multiplication by a constant $-c_5$. A multiplier 65 receives digital sample $a_4$ for multiplication by a constant $c_3$. A multiplier 67 receives digital sample $a_6$ for multiplication by a constant $-c_1$. It will be apparent to those skilled in the art that the matching of constants with respective digital samples is chosen to perform a convolution in accordance with equations discussed below. The outputs of multipliers 61, 63, 65, and 67 are applied to a summer 68, the output of which provides a single sample of the in-phase component I of the complex IF signal at a sampling rate $f_s'$ equal to $f_s/4$. Likewise, multipliers 71, 73, 75 and 77 multiply digital samples $a_1$, $a_3$, $a_5$, and $a_7$ by constants $c_6$, $-c_4$, $c_2$, and $-c_0$, respectively. The products are summed in a summer 78 to provide the quadrature-phase component Q of the complex IF signal at a sampling rate $f_s'$ equal to $f_s/4$.

Figure 8:
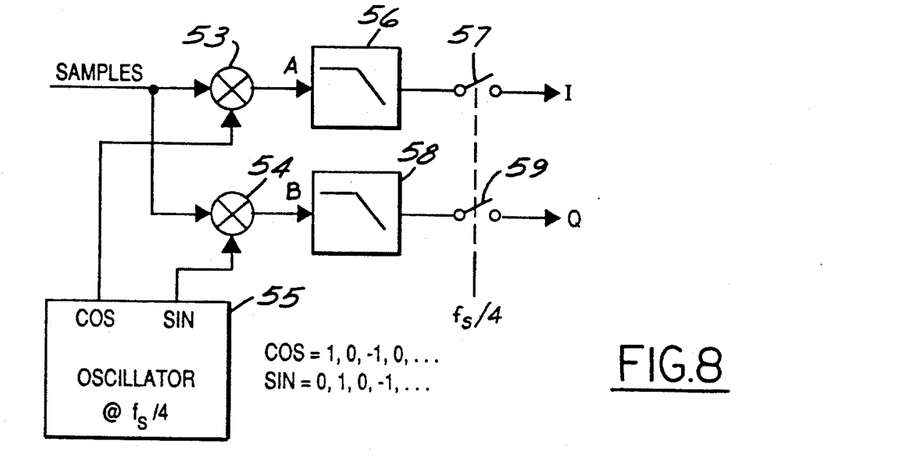
FIG. 8 shows a mathematically equivalent circuit showing the functionality of the concurrent filter of FIG. 7.
Figure 9:
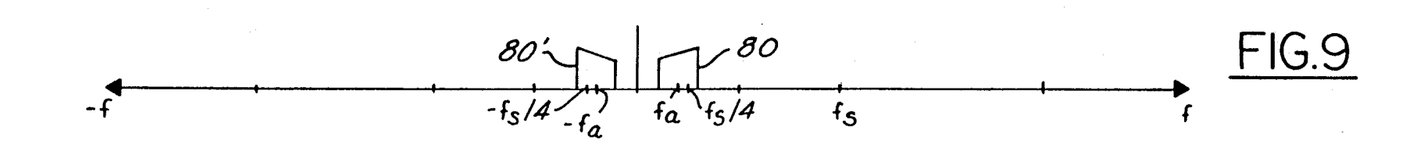
FIGS. 9-21 show signal spectra associated with the receiver in FIG. 6.

FIG. 8 illustrates the mathematically equivalent functions which are concurrently implemented in the filter of FIG. 7. A pair of mixers 53 and 54 receive cosine and sine injection signals, respectively, from a digital quadrature oscillator 55 having a frequency of $f_s/4$. The cosine product is provided to a lowpass filter 56 and a decimation-by-4 filter 57 (resampling at $f_s/4$) to provide the in-phase component I. The sine product from mixer 54 is provided to a lowpass filter 58 and a decimation-by-4 filter 59 to produce the quadrature-phase component Q. Since the oscillator frequency is at one-quarter of the sampling rate of the digital samples, and since the decimation ratio is a multiple of 4, the functions may be concurrently performed in the filter of FIG. 7 where the number of taps and the values of the filter-tap weights depend on the particular decimation and filtering to be performed. Lowpass filters 56 and 58 perform an anti-aliasing function which is performed in the concurrent filter by adjustment of the filter-tap weights (i.e., constants $c_0$ to $c_7$). Quadrature mixing is obtained by negation of certain weights and by dropping one-half of the taps otherwise required (i.e., not multiplying and summing alternate samples in each separate I and Q portion of the filter since they would only add zero to the sum).

More specifically, the concurrent filter 41 in FIG. 7 is a decimation filter with eight actual taps having respective multipliers $c_0$ to $c_7$. As is apparent from FIG. 8, the input sequence from the in-phase quadrature mixer 53 is $$A = a_0, 0, -a_2, 0, a_4, 0, -a_6, 0$$

and the input sequence from the quadrature-phase quadrature mixer 54 is $$B = 0, a_1, 0, -a_3, 0, a_5, 0, -a_7$$

Since the filter decimates by 4, four inputs are shifted into the decimation filter for each output sample. Filter-tap weights $c_0$ to $c_7$ are determined in a conventional manner for the anti-aliasing and decimation functions to be performed in a particular receiver. The resulting complex IF signal's I and Q components yielded by convolution in the concurrent filter are as follows:

$$I = c_0*0 + c_1*(-a_6) + c_2*0 + c_3*a_4 + c_4*0 +$$
$$c_5*(-a_2) + c_6*0 + c_7*a_0$$

and $$Q = c_0*(-a_7) + c_1*0 + c_2*a_5 + c_3*0 +$$
$$c_4*(-a_3) + c_5*0 + c_6*a_1 + c_7*0.$$

These equations can be rearranged as follows:

$$I = (-c_1)*a_6 + c_3*a_4 + (-c_5)*a_2 + c_7*a_0$$

and $$Q = (-c_0)*a_7 + c_2*a_5 + (-c_4)*a_3 + c_6*a_1.$$

Thus, the negation required by the mixing function can be included in the filter weights since the negated filter inputs always get multiplied by the same weights. The multiplication by zero required by the mixing function can be included in the filter by not summing odd or even samples for I and Q, respectively. This is why the shift registers in FIG. 7 are each only four taps instead of eight.

Filter coefficients $c_0$ to $c_7$ are determined according to known finite impulse response (FIR) decimation filter design methods. The foregoing concurrent filter may be obtained using a decimation filter having any number of taps which is a multiple of four. In the example of FIG. 6 for receiving AM stereo signals broadcast in the C-QUAM format, an FIR filter having 20 taps may be preferably employed to provide a 20 kHz lowpass filter with a 60 dB stopband and 0.5 dB ripple in the passband up to 7.5 kHz.

FIGS. 9-21 show frequency spectra of various signals present in FIG. 6. The analog intermediate frequency provided from an analog tuner to an A/D converter has a frequency spectrum component 80 having a center frequency $f_a$. A mirror image frequency component 80' is shown with a negative frequency to allow consideration of complex signals. For purely real signal, the negative frequency component will be a mirror image of the positive frequency component.

Figure 10:
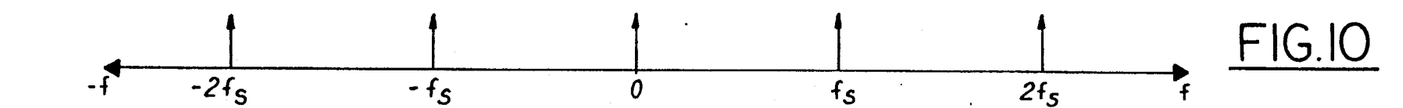

FIG. 10 shows the frequency spectrum of the sampling operation of the A/D converter which consists of all integer multiples of sampling rate $f_s$ including zero Hertz. The digital samples from the A/D converter comprise a digital IF signal having a frequency spectrum with a positive frequency component 81 having a center frequency $f_d$ and a mirror image negative component 81'. Further pairs of frequency components appear around each integer multiple of $f_s$ since analog-to-digital conversion can be considered to be a convolution of the frequency components shown in FIGS. 9 and 10. In order to be represented in the digital domain, the digital IF signal must have a complete frequency component 81 or 81' contained in the frequency range from $-f_s/4$ to $+f_s/4$. However, it is not at all necessary for the analog IF signal of FIG. 9 to be contained in this same range since other convolutions of the signals in FIGS. 9 and 10 can result in the spectrum of FIG. 11. Thus, the analog frequency $f_a$ can be any frequency satisfying the equation:

$$f_a = N*f_s \pm f_d$$

wherein N is any integer. Furthermore, the analog intermediate frequency signal and the sampling rate $f_s$ must be selected so that the spectral component 80 does not cross any integer multiple of $f_s/2$.

Figures 11, 12:
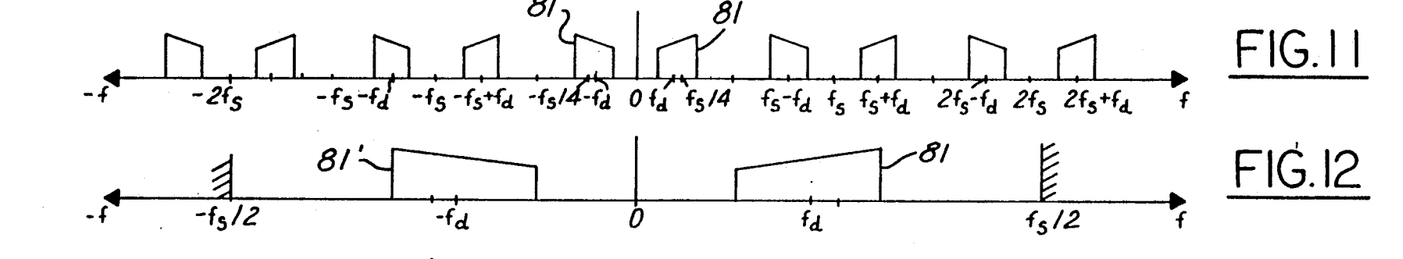

FIG. 12 shows components 81 and 81' on an expanded frequency scale, such expanded scale being used for the remainder of FIGS. 12-21. Hash-marks on FIGS. 12-21 are used to indicate that the spectrum within the hash-marks repeats in both frequency directions.

Figures 13, 14:
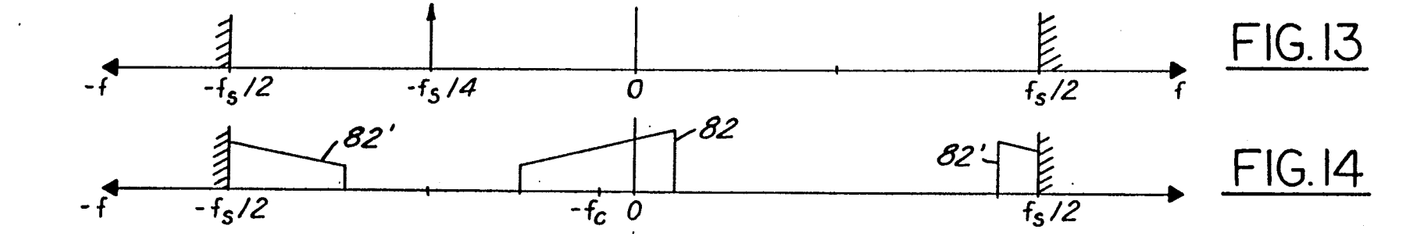

FIG. 13 shows the injection of a mixing signal at one-quarter of the sampling rate to translate frequency spectrum 81 shown in FIG. 12 to a near-zero IF spectrum 82 shown in FIG. 14. The injection signal is shown at $-f_s/4$ in FIG. 13. Spectrum component 81' is translated to 82' as shown in FIG. 14. An injection signal at $+f_s/4$ could also be used with the resulting spectrum in FIG. 14 being flipped around with respect to zero Hertz.

Figure 15:
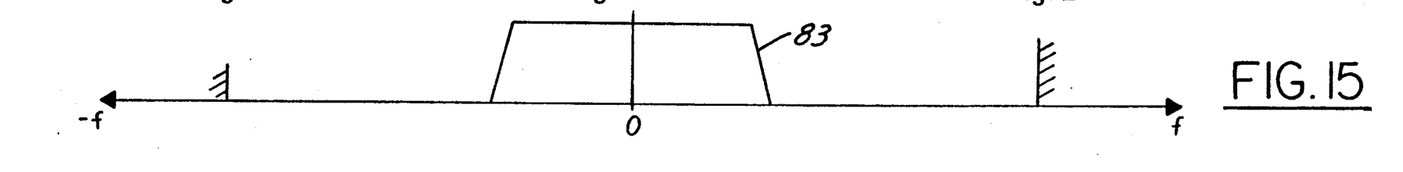

FIG. 15 shows a passband 83 corresponding to the lowpass (anti-aliasing) filtering function of the concurrent filter of the present invention. Passband 83 is determined by filter weights $c_0$ to $c_7$.

Figure 16:
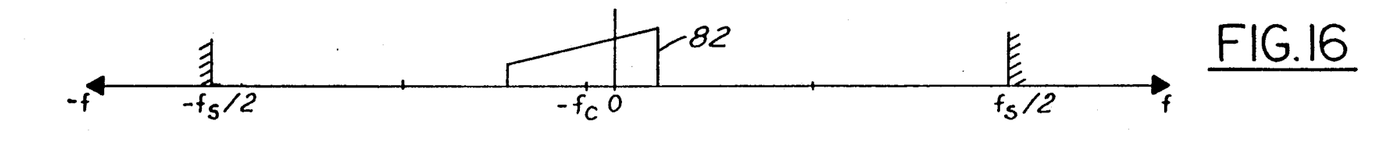
Figure 17:
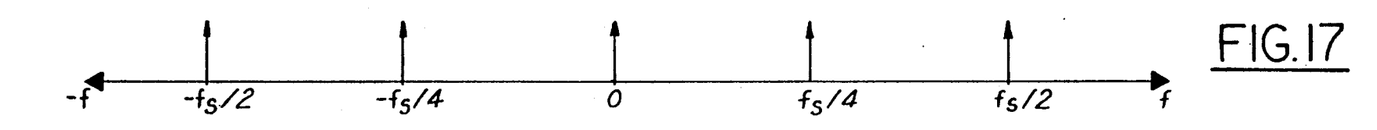
Figure 18:
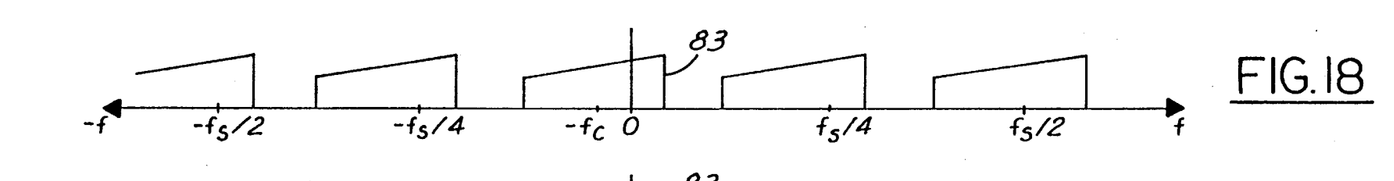
Figures 19, 20:
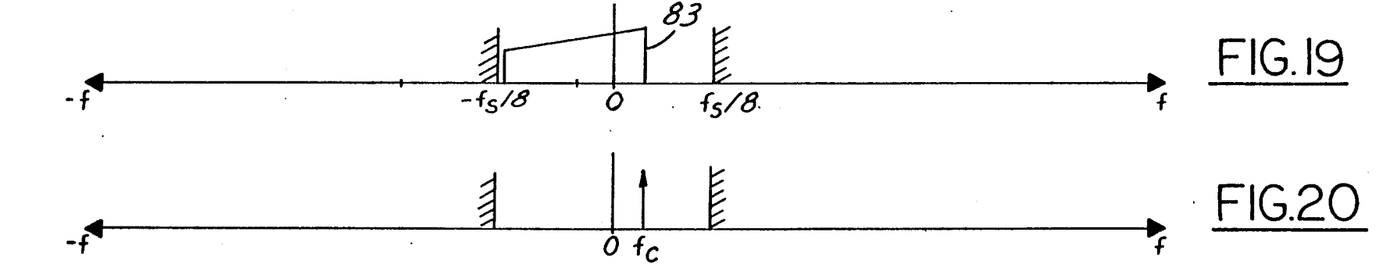
Figure 21:
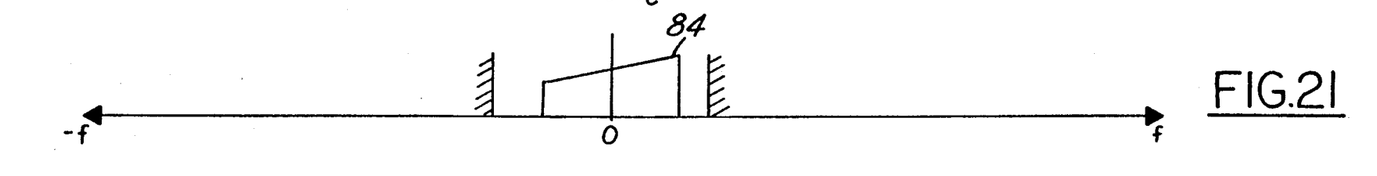

The spectrum of the output of the lowpass filter function is shown in FIG. 16 where only spectral component 82 of the complex IF signal remains. Prior to output from the concurrent filter, the complex signal shown in FIG. 16 is decimated by 4 (i.e., resampled at a sampling frequency $f_s'$ equal to $f_s/4$) as shown in FIG. 17. The decimated output has a spectrum shown in FIG. 18 with a component 83 which repeats at multiples of $f_s/4$. As shown in FIG. 19, only the component 83 between $-f_s/8$ and $f_s/8$ is considered.

A changing injection frequency $f_c$ which is synchronous with the instantaneous phase of the complex IF signal and generated by a phase-locked loop is shown in FIG. 20. Mixing of the signals of FIG. 19 and FIG. 20 in the synchronous detector of the present invention results in a zero-Hertz demodulated signal having a spectrum 84 shown in FIG. 21.

Figure 22:
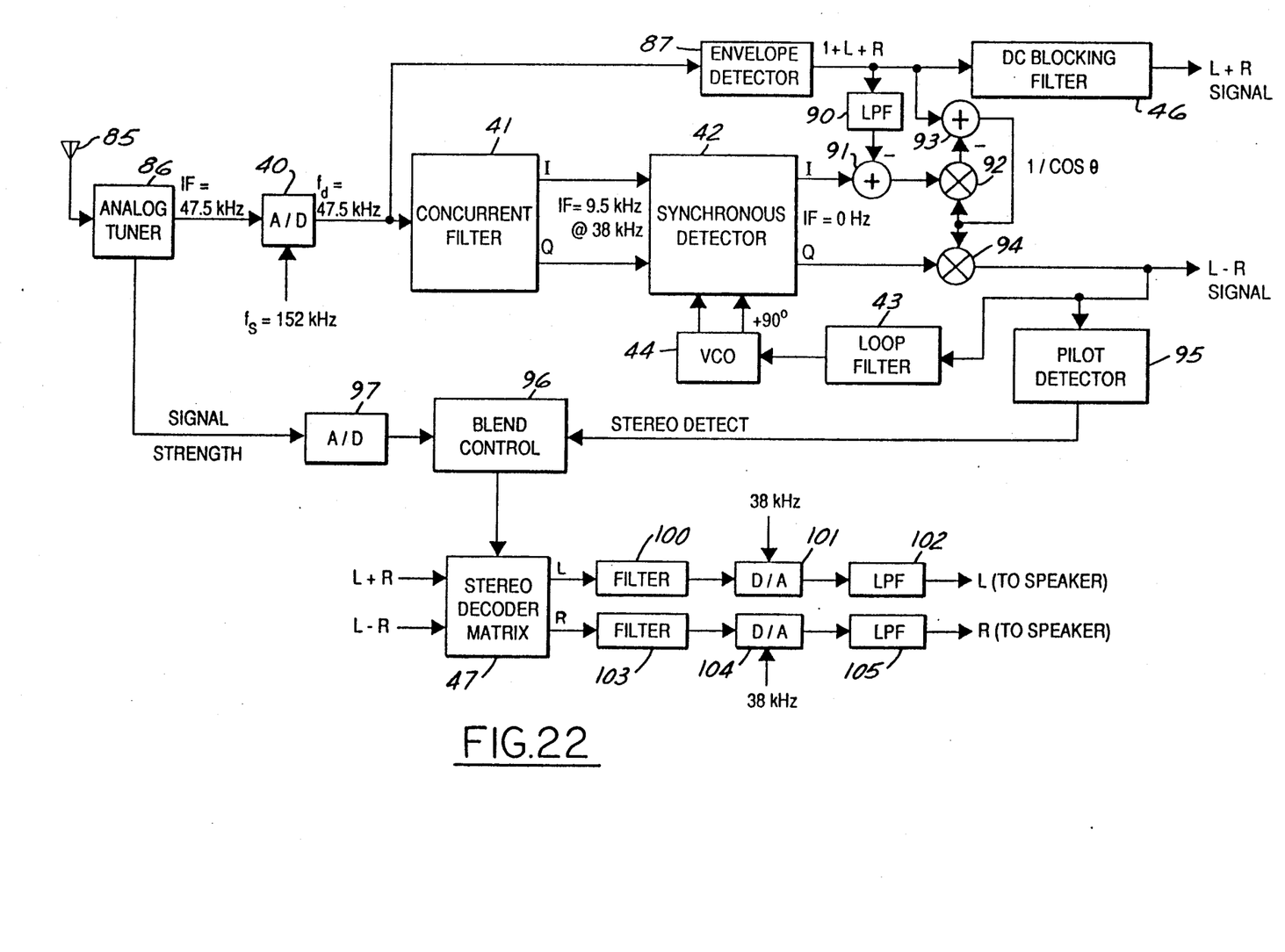
FIG. 22 is a block diagram showing a more detailed example of a receiver according to the invention of FIG. 6.

An application of the present invention to an AM stereo C-QUAM receiver is shown in greater detail in FIG. 22. An antenna 85 provides RF broadcast signals to an analog tuner 86. A bandlimited IF signal having a center intermediate frequency of 47.5 kHz is provided from analog tuner 86 to A/D converter 40. A/D converter 40 operates with a sampling rate $f_s$ equal to 152 kHz and, therefore, provides a first digital IF signal also at an intermediate frequency of 47.5 kHz. Concurrent filter 41, synchronous detector 42, loop filter 43, and VCO 44 operate in the same manner as described with reference to FIG. 6. The complex IF signal from concurrent filter 41 has a sampling rate at $f_s/4$ which equals 38 kHz in this example. Since the complex injection frequency provided by the quadrature mixing operation of concurrent filter 41 also corresponds to 38 kHz, the complex in-phase component I and quadrature-phase component Q have an intermediate frequency of 9.5 kHz. Synchronous detector 42 converts this 9.5 kHz IF frequency to a zero-Hertz IF consisting of a synchronous-detector I signal and a synchronous-detector Q signal.

FIG. 22 shows an alternate connection of an envelope detector 87 for receiving the first digital IF signal from A/D converter 40 (i.e., a real IF signal rather than a complex IF signal). Due to the higher frequency of this IF signal, envelope detector 87 performs envelope detection using the more conventional manner of providing a peak detection and lowpass filter function rather than determining the square root of the sum of the squares of the complex signals as used in FIG. 6.

The receiver shown in FIG. 22 employs the implicit calculation method for converting the demodulated C-QUAM signals to a QUAM format. A lowpass filter 90 filters the 1+L+R signal from envelope detector 87 to generate its DC component (related to the signal strength of the received signal) and provides an output to an inverting input on a summer 91 for subtracting the DC component from the synchronous-detector I signal from synchronous detector 42. The output of summer 91 is connected to one input of a multiplier 92 which has its output connected to an inverting input of a summer 93. A noninverting input of summer 93 receives the output from envelope detector 87. The output of summer 93 provides a correction signal for converting the C-QUAM signals to QUAM signals. The correction signal has a magnitude equal to $1/COS\theta$, where $\theta$ represents the phase encoded stereo information as defined by the C-QUAM format. The correction signal is provided to the remaining input of multiplier 92 and to one input of a multiplier 94. Multiplier 94 receives the synchronous detector Q signal from synchronous detector 42 at its remaining input and produces a L−R signal at its output which is a corrected QUAM signal.

The L+R signal from DC blocking filter 46 and the L−R signal from multiplier 94 are coupled to respective inputs of stereo decoder matrix 47. The L−R signal from multiplier 94 is further connected to loop filter 43 and to a pilot detector 95. A stereo detect signal is provided from pilot detector 95 to blend control 96 when a stereo pilot carrier is present in the L−R signal. Blend control 96 controls the stereo blend of stereo decoder matrix 47 based on the detection of the stereo pilot and on a signal strength signal obtained from analog tuner 86 through an A/D converter 97.

A left stereo signal L is provided from stereo decoder matrix 47 to a digital anti-aliasing lowpass filter 100, a D/A converter 101, an analog lowpass filter 102 and a left channel speaker (not shown). A right stereo signal R is provided to a digital anti-aliasing lowpass filter 103, a D/A converter 104, an analog lowpass filter 105 and a right channel speaker (not shown). D/A converters 101 and 104 receive a sampling rate signal corresponding to the final sampling rate $f_s'$ of 38 kHz (i.e., $f_s/4$). Filters 100 and 103 are not necessary in this specific example and are only shown in connection with the possibility that it may be desired in some instances to increase the sampling rate for D/A conversion. In that event, filters 100 and 103 simplify the analog filtering that is required after D/A conversion: Filters 100 and 103 are not used if no sampling rate increase is performed.

Figure 23:
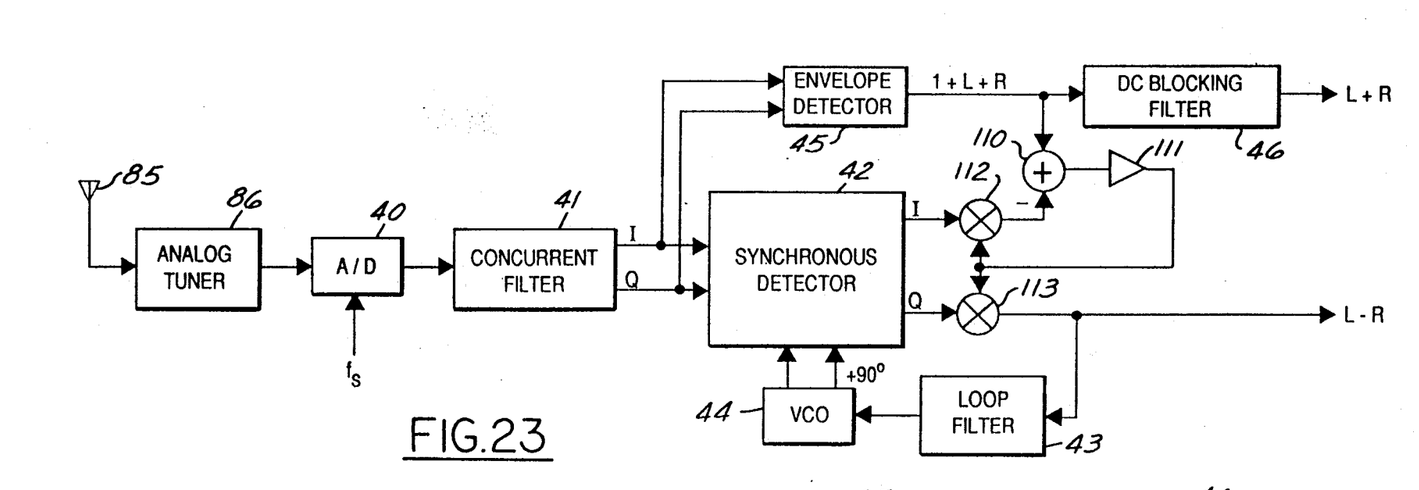
FIG. 23 is a block diagram showing an alternate embodiment for a C-QUAM receiver of the present invention.

FIG. 23 shows an alternate embodiment of the invention wherein conversion from C-QUAM to QUAM is obtained using the inverse function method. The output of envelope detector 45 is provided to an input of a summer 110 having its output connected to a high gain amplifier 111. The output of amplifier 111 provides a $1/COS\theta$ correction signal to an input of a multiplier 112 and an input of a multiplier 113. Multiplier 112 has another input connected to the synchronous-detector I signal from synchronous detector 42. The output of multiplier 112 is connected to an inverting input of summer 110. Multiplier 113 has another input connected to receive the synchronous-detector Q signal from synchronous detector 42. The output from multiplier 113 provides the corrected QUAM signal corresponding to the L−R signal.

Figure 24:
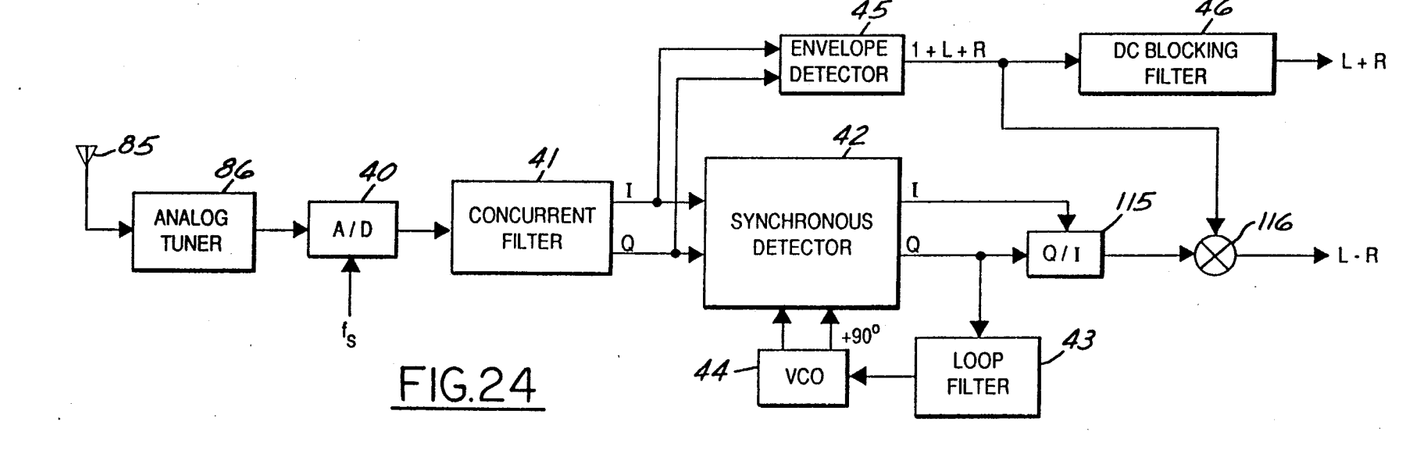
FIG. 24 is a block diagram of yet another alternate embodiment of a C-QUAM receiver of the present invention.

FIG. 24 illustrates the divider method for converting C-QUAM to QUAM. A divider 115 is connected to synchronous detector 42 and it divides the synchronous-detector Q signal by the synchronous-detector I signal. Division is implemented in DSP using shift and subtract operations. The result of the division is provided to one input of a multiplier 116 for multiplying the divider signal by the envelope detector signal to produce the corrected L−R signal.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed is:

1. A receiver for digitally processing an analog radio-frequency (RF) broadcast signal comprising:
   tuner means for receiving said analog RF broadcast signal and generating an analog intermediate frequency (IF) signal having a frequency $f_a$;
   analog-to digital converter means operating at a fixed sampling rate $f_s$ and coupled to said tuner means for converting said analog IF signal to a first digital IF signal comprised of a plurality of samples, said first digital IF signal being contained in the frequency range between zero and $f_s/2$, said first digital IF signal having a center frequency $f_{d1}$ about equal to $f_s/4$;
   concurrent complex mixing, filtering, and sample-rate reducing means coupled to said analog-to-digital converter means for generating a complex IF signal having a near-zero center frequency $f_{d2}$ within the frequency range from $-f_s/8$ to $+f_s/8$, said complex IF signal having an in-phase component I and a quadrature-phase component Q each being formed from weighted alternate samples of said first digital IF signal according to a set of predetermined weights, said weights corresponding to a complex nonsynchronous mixing signal having a frequency equal to $f_s/4$ and corresponding to a reduction in sampling rate by a whole multiple of 4; and
   second complex mixing means coupled to said concurrent means for synchronously detecting said complex IF signal, said second complex mixing means including a variable oscillator producing sine and cosine signals locked to the frequency and phase of said complex IF signal.

2. A receiver for receiving stereo signals broadcast in the C-QUAM format comprising:
   tuner means for receiving said analog broadcast signal and generating an analog C-QUAM intermediate frequency (IF) signal having a frequency $f_a$;
   analog-to-digital converter means operating at a fixed sampling rate $f_s$ and coupled to said tuner means for converting said analog IF signal to a first digital IF signal comprised of a plurality of samples, said first digital IF signal being contained in the frequency range between zero and $f_s/2$, said first digital IF signal having a center frequency $f_{d1}$;

concurrent complex mixing, filtering, and sample-rate reducing means coupled to said analog-to-digital converter means for generating a complex IF signal within the frequency range from $-f_s/8$ to $+f_s/8$ and having a center frequency $f_{d2}$, said complex IF signal having an in-phase component I and a quadrature-phase component Q each being formed from weighted alternate samples of said first digital IF signal according to a set of predetermined weights, said weights corresponding to a complex nonsynchronous mixing signal having a frequency equal to $f_s/4$ and corresponding to a reduction in sampling rate by a whole multiple of 4;

a synchronous detector demodulating said complex IF signal to produce a detected C-QUAM signal including a synchronous-detector I signal and a synchronous-detector Q signal, said detected C-QUAM signal having a phase-locked center frequency at substantially zero;

an envelope detector generating an envelope signal corresponding to the envelope of said broadcast signal; and conversion means coupled to said synchronous detector and said envelope detector for converting said detected C-QUAM signal to a QUAM signal.

3. The receiver of claim 2 wherein said concurrent means is comprised of a finite impulse response filter.

4. The receiver of claim 3 wherein said weights concurrently provide an anti-aliasing filter function.

5. The receiver of claim 2 wherein $f_{d1}$ is about equal to $f_s/4$ and $f_{d2}$ is nearly equal to zero.

6. The receiver of claim 2 further comprising:

matrix means coupled to said envelope detector and said conversion means for generating said stereo signals from said envelope signal and said QUAM signal.

7. The receiver of claim 6 further comprising digital-to-analog converter means coupled to said matrix means for generating analog stereo signals.

8. The receiver of claim 2 wherein said conversion means comprises:

implicit calculating means coupled to said envelope detector and said synchronous detector for generating a correction signal using implicit feedback; and multiplier means coupled to said synchronous detector and said implicit calculating means for multiplying said synchronous-detector Q signal and said correction signal to generate a QUAM signal corresponding to the difference of said stereo signals.

9. The receiver of claim 2 wherein said conversion means comprises:

comparing means coupled to said envelope detector and said synchronous detector for generating a correction signal based on the error between said envelope signal and said synchronous-detector I signal;

multiplier means coupled to said synchronous detector and said comparing means for multiplying said synchronous-detector Q signal and said correction signal to generate a QUAM signal corresponding to the difference of said stereo signals.

10. The receiver of claim 2 wherein said conversion means comprises:

divider means coupled to said synchronous detector for dividing said synchronous-detector Q signal by said synchronous-detector I signal to generate a divider signal; and multiplier means coupled to said divider means and said envelope detector for multiplying said divider signal and said envelope signal to generate a QUAM signal corresponding to the difference of said stereo signals.

11. The receiver of claim 2 further comprising stereo detect means coupled to said conversion means for detecting the presence of a stereo pilot signal in said QUAM signal.

12. The receiver of claim 11 further comprising blend control means coupled to said stereo detect means for selecting stereo or monophonic reception in accordance with the detection of said stereo pilot signal by said stereo detect means.

13. The receiver of claim 2 wherein said synchronous detector comprises:

loop filter means coupled to said conversion means for filtering said QUAM signal;

oscillator means coupled to said loop filter means for producing sine and cosine signals locked to the frequency and phase of said QUAM signal; and complex mixer means coupled to said oscillator means and said concurrent means for mixing said complex IF signal with said sine and cosine signals to produce said detected C-QUAM signal.

14. A method for digitally processing an AM stereo signal received as an analog broadcast signal using quadrature encoding of stereo information, said method comprising the steps of:

receiving said analog broadcast signal;

generating an analog intermediate frequency (IF) signal having a center frequency $f_a$;

converting said analog IF signal to a first digital IF signal at a fixed sampling rate $f_s$, said first digital IF signal being contained in the frequency range between zero and $f_s/2$, said first digital IF signal having a center frequency $f_{d1}$;

filtering said first digital IF signal in a digital filter to obtain a complex IF signal within the frequency range from $-f_s/8$ to $+f_s/8$ and having a center frequency $f_{d2}$, said complex IF signal having an in-phase component I and a quadrature-phase component Q each being formed from weighted alternate samples of said first digital IF signal according to a set of predetermined weights, said weights corresponding to a complex nonsynchronous mixing signal having a frequency equal to $f_s/4$ and concurrently corresponding to a reduction in sampling rate by a whole multiple of 4;

synchronously demodulating said complex IF signal to obtain a demodulated baseband signal;

detecting an envelope of said broadcast signal to generate an envelope signal;

modifying said demodulated baseband signal in accordance with said envelope signal; and recovering said stereo information from said modified demodulated baseband signal.

15. The method of claim 14 wherein $f_{d1}$ is about equal to $f_s/4$ and $f_{d2}$ is about equal to zero.

* * * * *